C. FORTH.
PIPE COUPLING.
APPLICATION FILED FEB. 10, 1912.

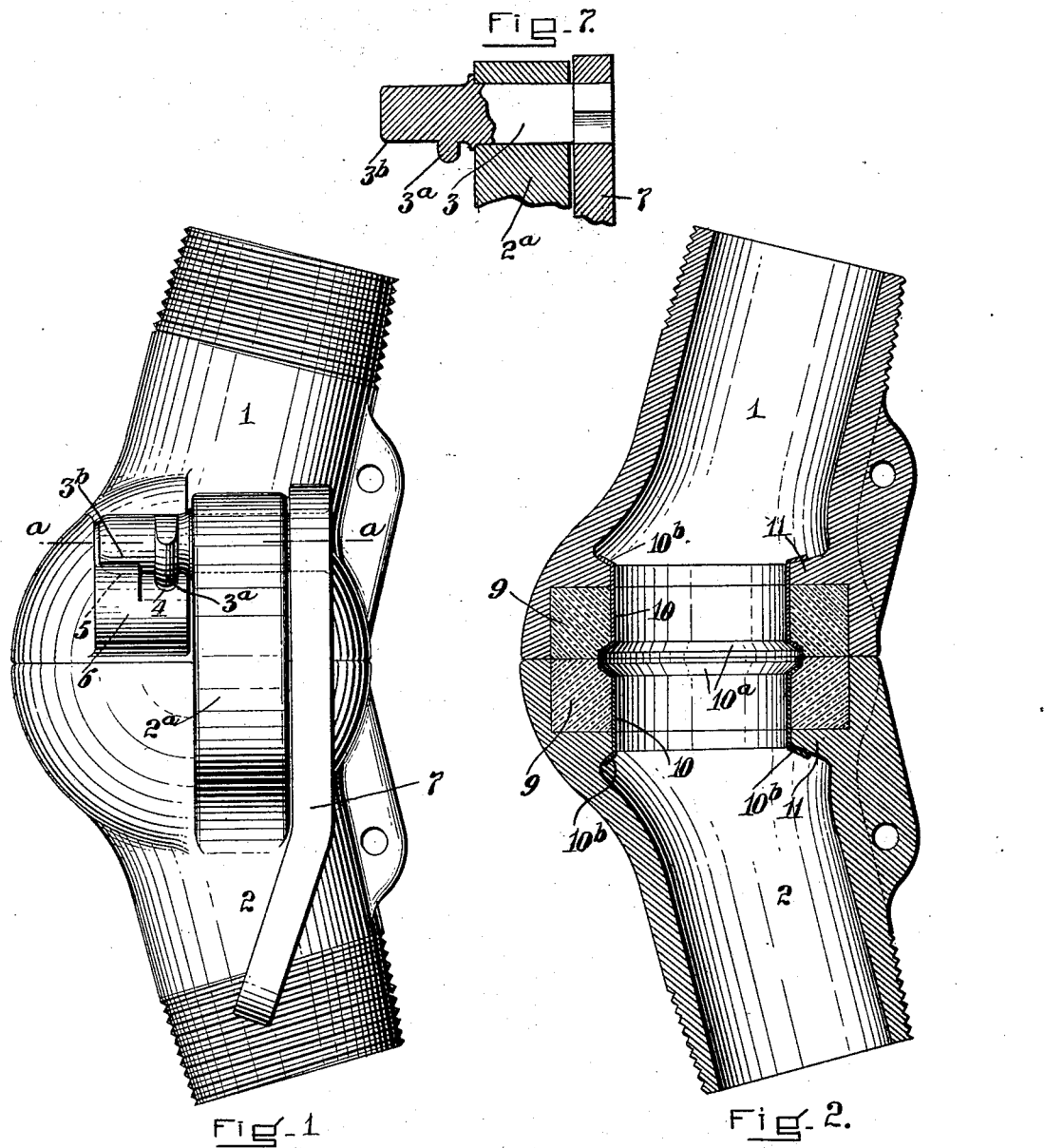

1,116,877.

Patented Nov. 10, 1914.
4 SHEETS—SHEET 4.

UNITED STATES PATENT OFFICE.

CHARLES FORTH, OF BOSTON, MASSACHUSETTS.

PIPE-COUPLING.

1,116,877.  Specification of Letters Patent. Patented Nov. 10, 1914.

Application filed February 10, 1912. Serial No. 676,866.

*To all whom it may concern:*

Be it known that I, CHARLES FORTH, a citizen of the United States, residing at Boston, in the county of Suffolk and State of Massachusetts, have invented certain new and useful Improvements in Pipe-Couplings, of which the following is a specification, reference being had therein to the accompanying drawing.

This invention relates to pipe couplings and has reference more particularly to that type of coupling designed for use in train pipe systems in connection with terminals of steam pipes. Couplings for this purpose comprise usually two hollow coupling heads adapted to be connected respectively to the terminals of the steam pipes at the ends of the cars, which heads in the coupling operation, are placed together end to end and locked by suitable locking means carried by the heads.

The object of the present invention is to provide for the convenient and speedy coupling or uncoupling of the heads, and their maintenance in locked condition without liability of accidental disconnection or of leakage of the fluid between the heads; and the invention consists mainly of an improved form of locking device which will enable the parts to be conveniently and quickly connected together, and will effectually prevent their relative displacement in any direction.

In the particular embodiment of the invention as illustrated by the accompanying drawings, which embodiment is shown by way of example as being one suitable for realizing the objects and advantages of the invention, each head is provided at one side with a locking stud having a laterally projecting rib and an adjacent bearing surface, and at the opposite side the head is provided with a lateral lug having a groove and an adjacent socket, the rib and bearing surface on the stud carried by each of the heads, being adapted to coöperate respectively with the groove and socket on the opposite head when the two are placed face to face, and the said devices operating when the locking studs are turned, to draw the heads firmly and fixedly together in interlocked coupled relation. It is manifest, however, that the invention in its broader aspects may be embodied in other forms; and it will be understood that the invention is not limited to any particular form or construction of the parts except in so far as such limitations are specified in the claim.

Figure 3:
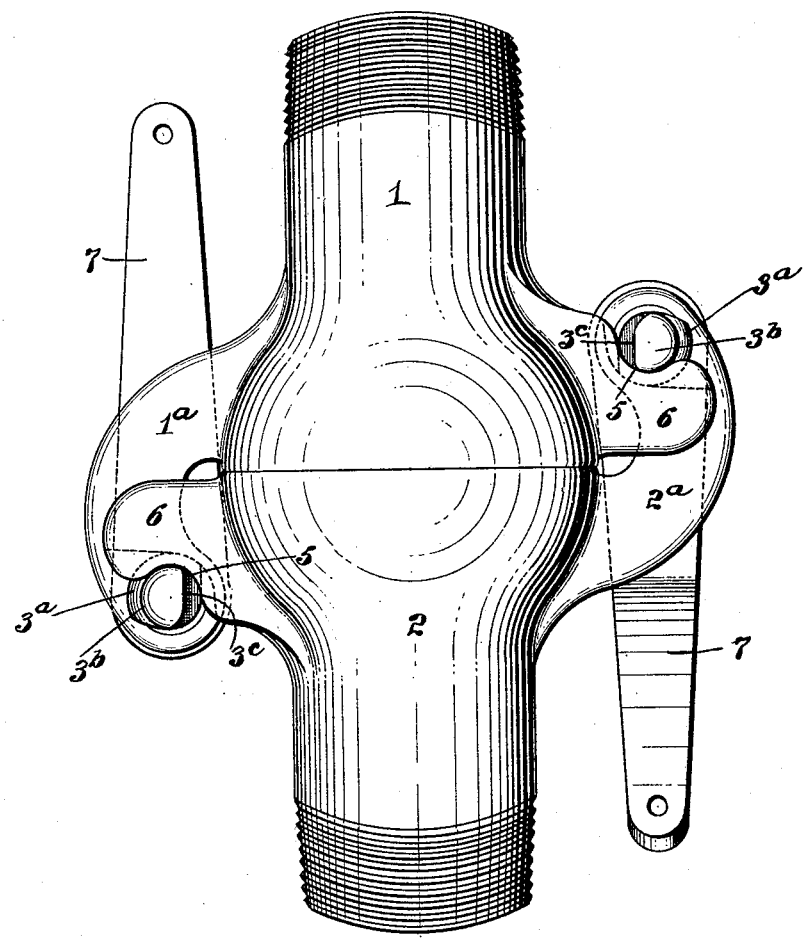
Figure 4:
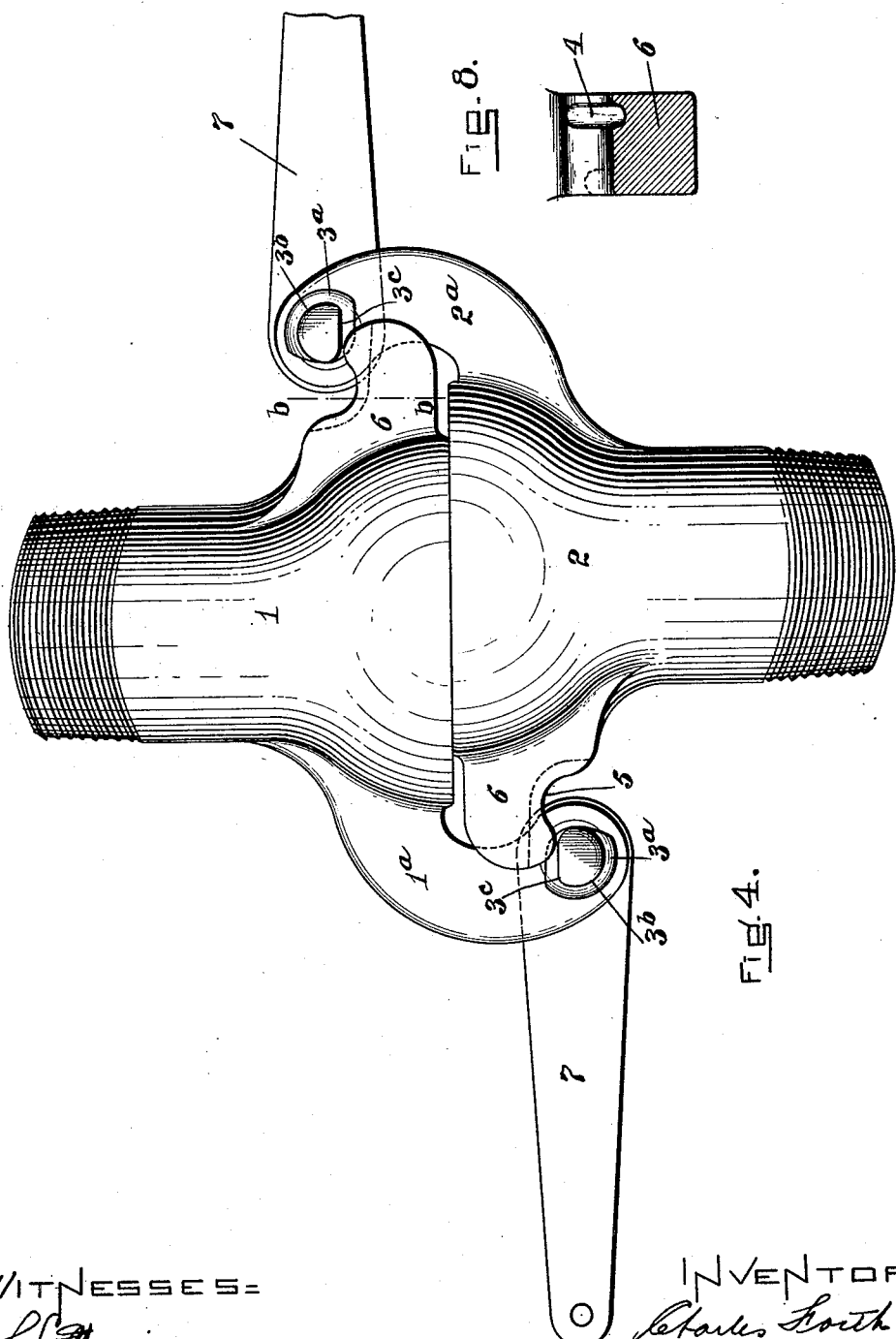
Figure 5:
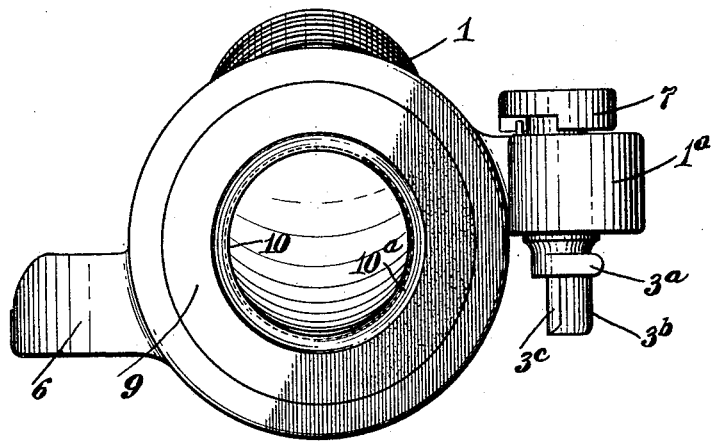
Figure 6:
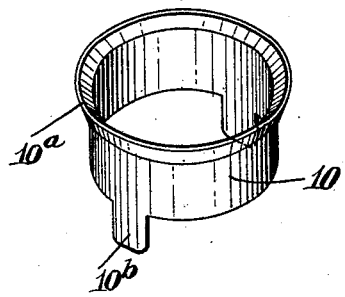

In the accompanying drawings: Figure 1 is a side elevation of a pipe coupling having my invention embodied therein. Fig. 2 is a longitudinal central section through the same. Fig. 3 is a plan view of the heads coupled together. Fig. 4 is a plan view showing how the two heads are placed end to end preparatory to their being locked together, as in Fig. 3. Fig. 5 is a face view of one of the heads. Fig. 6 is a perspective view of a detail. Fig. 7 is a sectional elevation taken on the line $a-a$ of Fig. 1, showing the form and mounting of the locking stud. Fig. 8 is a sectional elevation on the line $b-b$ of Fig. 4, showing the form of the groove and socket with which the locking stud coöperates.

My improved coupling comprises two complementary hollow heads 1 and 2, the adjacent faces of which are flat so that they may be placed end to end with said faces in close contact, as shown more particularly in Fig. 2, with the result that a continuous passage will be formed through the heads for the flow of the fluid under control. Each head is provided at one side with a laterally projecting arm, an arm $1^a$ on the head 1, and an arm $2^a$ on the head 2, which arms extend longitudinally beyond the respective flat faces of the heads, and are disposed respectively on opposite sides of the coupling when the heads are placed end to end. Mounted in a bearing in the end of each arm is a rocking locking stud 3, provided with an annular rib $3^a$ and with an adjacent bearing surface $3^b$, which rib and bearing surface on the stud of each head, are adapted to coöperate respectively with a radially extending groove 4 and an adjacent socket 5 formed in a laterally projecting lug 6 on the opposite head to effect the locking together of said heads, it being understood that each head has at one side a locking stud and at its opposite side a groove and socketed lug, which parts are so related to each other and to the corresponding parts on the opposite head, that when the heads are placed together endwise face to face to be coupled, the locking stud on each head will be in position to coöperate with the lugs on the opposite head.

The function of the rib on the locking stud is, when entered in the groove on the opposite head, to interlock or connect the parts together so that there can be no relative shifting of the heads laterally or in a circumferential direction; while the function of the bearing surface on the locking stud when it coöperates with the socket on the other head, is to draw the two heads forcibly and tightly together to effect their firm connection, as well as to prevent relative lateral shifting of the heads. To bring these results about, the rib on the locking stud is shaped in cross section so as to fit the groove, and it extends in a curve struck from the axial center of the stud, so that when the stud is rocked, which is effected by means of a hand lever 7 fixed to the end of the stud, the rib will be turned into the groove and interlocked therewith, as shown more particularly in Figs. 3 and 7. The bearing surface $3^b$ on the stud extends in a curve struck from the same center as the rib, and is formed with a flat face $3^c$ extending at less distance from the axial center of the stud than the surface $3^b$, the result being that after the heads have been placed together face to face, and the lever 7 is operated to rock the stud, the bearing surface $3^b$ will act in the socket 4 on the opposite head, with a cam effect, and will draw the two heads forcibly together in coupled relation, as shown in Fig. 3, the ribs on the two studs, as before described, having been by this action of the levers 7, turned into the grooves 4 on the opposite heads.

In the assemblage of the heads to effect their connection, they are first brought together end to end as shown in Fig. 4, and slightly out of alinement, after the levers have been first thrown outwardly in a position at right angles to the axis of the coupling. In this position of the parts the flat surfaces $3^c$ on the locking studs will stand just free of the outer walls of the sockets 5 in the lugs, and the ribs $3^a$ on the studs will stand in alinement with the grooves 4 in the lugs. The heads now have their faces in contact with each other and are next shifted laterally into alinement with each other preparatory to their final connection in full coupled condition. The levers 7 on the respective heads are now turned inwardly, each alongside its head, to the position shown in Fig. 3, this action rocking the locking studs and entering the ribs thereon in the respective grooves 4, and at the same time entering the bearing surfaces $3^b$ in the sockets 5, with the result that the two heads will be drawn firmly and tightly together, their displacement in one direction laterally being prevented by the engagement of the bearing surfaces $3^b$ in the sockets 5, and their displacement in the other direction laterally, being prevented by the engagement of the ribs $3^a$ in the grooves 4. In the uncoupling action, the above described operations are reversed, the levers being first thrown outwardly to the position of Fig. 4, which action, by turning the studs, will release the parts; whereupon the heads may be shifted out of alinement to the position shown in Fig. 4, and finally separated endwise.

In order that the meeting faces of the two heads will fit together in close contact so as to effectually prevent the leakage of the fluid between the parts when the heads are locked together, I provide gaskets 9, 9, of suitable material, such as graphite or some appropriate composition, which gaskets are in the form of rings seated respectively in sockets in the ends of the heads and presenting flat and smooth meeting faces. The gasket may be held in its seat in any appropriate manner, but I prefer to employ for this purpose a metal collar 10, such as shown in Fig. 6, which collar fits within the gasket and is provided at its outer edge with a flaring flange $10^a$ bearing against a sloping surface on the edge of the ring, and is provided at its inner edge with tongues $10^b$ adapted to be bent outwardly so as to engage beneath an annular internal shoulder 11 on the head.

Having thus described my invention, what I claim is:

In a pipe coupling, the combination of two heads having flat contacting surfaces adapted to fit face to face, each of said heads being formed at one side with an arm extending longitudinally beyond the flat face of the head, and each of said heads being provided at its opposite side with a laterally projecting lug, the said lugs being formed in their outer sides with radially extending grooves and adjacent bearing surfaces, rocking locking studs mounted in the ends of the respective arms and provided with ribs adapted to enter the grooves in the lugs, and provided also with adjacent bearing surfaces adapted to coöperate with the bearing surfaces on the lugs, and levers connected fixedly with the respective studs, the relation of said parts being such that when the levers are turned outwardly, the two heads may be shifted transversely into alinement with each other, and when the levers are turned inwardly alongside the heads, the locking studs will act to draw them in forcible contact and lock them against relative circumferential movement.

In testimony whereof I affix my signature in presence of two witnesses.

CHARLES FORTH.

Witnesses:
 JOSIAH S. DEAN,
 STEPHEN P. CUSHMAN.